Figure 1:
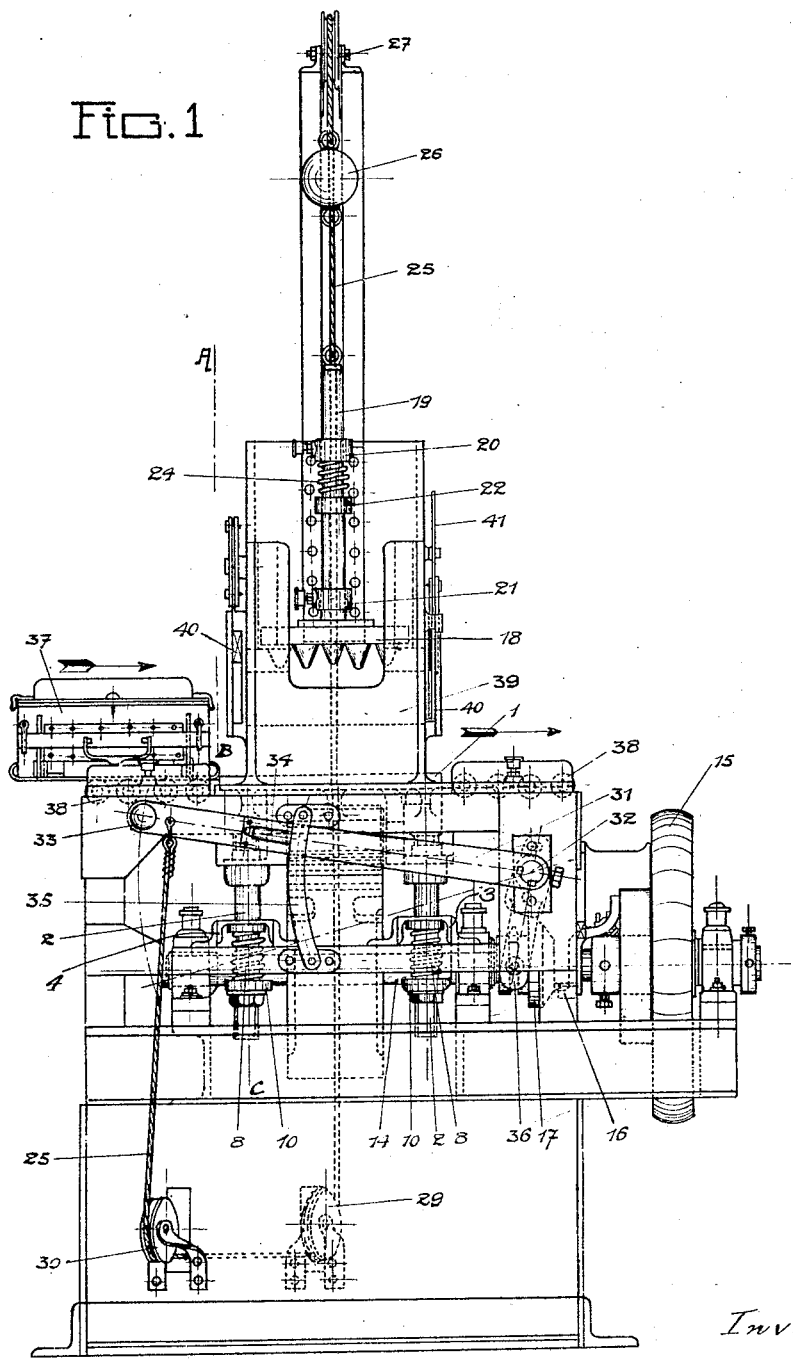

July 22, 1924.  
E. V. PREUSS  
1,502,157  
MANUFACTURE OF MOLDED ARTICLES  
Filed June 26, 1922   4 Sheets-Sheet 1

Inventor:  
Emile Victor Preuss  
By  
Attorney

July 22, 1924.

E. V. PREUSS

MANUFACTURE OF MOLDED ARTICLES

Filed June 26, 1922    4 Sheets-Sheet 3

1,502,157

July 22, 1924.

E. V. PREUSS 1,502,157

MANUFACTURE OF MOLDED ARTICLES

Filed June 26, 1922    4 Sheets-Sheet 4

Inventor:
Emile Victor Preuss
By
Attorney

Patented July 22, 1924.

1,502,157

UNITED STATES PATENT OFFICE.

EMILE VICTOR PREUSS, OF KELLES, NEAR BRUSSELS, BELGIUM.

MANUFACTURE OF MOLDED ARTICLES.

Application filed June 26, 1922. Serial No. 571,045.

*To all whom it may concern:*

Be it known that I, EMILE VICTOR PREUSS, subject of the King of Belgium, residing at Kelles, near Brussels, Belgium, have invented certain new and useful Improvements in the Manufacture of Molded Articles, of which the following is a specification.

This invention relates to the manufacture of molded articles, as, for instance, construction elements in concrete or the like.

The invention consists essentially in the fact that the concrete or other material is jarred and rammed in a mould, and in utilizing for that purpose a table whereon the mould is placed and a rammer bearing on the material filling the mould, the mould and the rammer being maintained in vertical alignment.

By imparting to the table sudden upward and downward motions, suitably regulated as for amplitude and periodicity, a succession of abrupt movements of the table away from the mould are produced and of the material in the mould away from the rammer and, consequently, a succession of falls of the mould on the table and the rammer on the material. As the rammer merely leaves the upper surface of the material, and falls down again upon said surface when the mould and its contents have reached the limit of their downward motion produced by the table, the dislocation of the composition during the jarring and ramming operations is prevented and the rising to the upper surface of the biggest or heaviest particles of the material.

The economical manufacture of construction elements or other molded articles, when the use to which such articles or elements are to be put permits, necessitates the employment of compositions containing, for the most part, waste materials such as for instance, slags, ashes, or broken tiles, or waste building material or coal mine waste, crushed and screened. It is evident that compositions formed of such materials comprising large and small particles incorporated in, and bound together by, mortar, may not be subjected to compression strains. Indeed, such strains cause the pulverization of a certain quantity of particles of the composition, these particles absorbing then a further quantity of mortar, and forming in the molded mass parts which are not entirely surrounded by mortar and which are devoid of cohesion. On the other hand, mere jogging without superficial ramming, produces in the mould classification of the particles constituting the composition, according to their size and their density, and the molded body produced in this manner, necessitates, for presenting a sufficient homogenity, the use of a composition whose ingredients are of finer and more regular size.

This invention attempts to overcome the above-mentioned disadvantages, and also relates to an apparatus for carrying out the improved process hereinafter described.

The apparatus comprises, principally, a table provided with a vertical guide and maintained at a desired level by means of springs acting on it in opposite directions, upward and downward. A cam, drive or similar device, periodically moves the table in one direction against the action of a part of the springs and then leaves it to the action of the springs which are compressed, in such a way that the table is replaced, in effecting a displacement in the opposite direction, in its position of equilibrium between the springs. The mould and the rammer are guided in the vertical direction and the rammer bears freely on the composition placed in the mould, which latter in its turn bears freely on the table.

In order to produce sudden displacements of the table, at suitable intervals and of desired amplitude, it is necessary that the cam have a degree of eccentricity sufficient to enable it to act with a great linear speed and to give to the table suitably timed movements. To effect this, the cam will have, preferably, a reduced circular evolution.

One of the principal purposes of the invention is to provide for a sudden movement of the table, that is due to the greatest linear speed of the cam, this greatest linear speed being rendered necessary and possible by the notable increase of the diameter of the fly-wheel on which the cam is placed. This increase of the diameter is so considerable with regard to the diameters of the cams of the jogging tables ordinarily used, that the results obtained by its applications form a new and important improvement in this kind of apparatus. These results are obtained in consequence of the utilization of the greatest possible linear speed in order to maintain a sufficient interval between the movements and to obtain a sudden action.

With regard to the rammer, which may be guided in the frame or in the support of the mould, its weight and form may be suitably chosen in the manner above described. In order to facilitate the action of the rammer, it may be suspended by a cable (or chain) passing over a suspension-pulley, the extremity of the cable being connected to an operating lever pivoted to the frame of the apparatus, and which may be kept motionless with regard to this frame in order to maintain the rammer in its raised position during the removal and the replacement of the mould. As the rammer must be lowered upon the composition placed in the mould, in order to pack it, the lever whereon the cable is fixed is released and it is necessary to counterbalance the weight of the cable so as to permit the rammer to properly function.

Accordingly, a counter-weight is fixed to the cable between the rammer and the suspension pulley in order to draw back the cable and its lever, this counter-weight leaving a portion of the cable between it and the rammer free to permit the working of the rammer.

In order to facilitate the working of the apparatus, the operating lever may be connected to the friction-clutch which controls the operation of the apparatus, in such a manner that the stroke of the lever in one direction successively effects the lowering of the rammer and the closing of the clutch and consequent starting of the machine. The stroke of the lever in the other direction successively effects the opening of the clutch and consequent stoppage of the machine, and the raising of the rammer.

The amplitude of the movement of the table may be regulated by displacing the bearings for the supporting-springs, in order to increase or to decrease the distance between the table and the cam. In the same way, the adjustable positioning of the bearings for the springs permits the regulation of the tension of the latter, in order to establish the desired relation between the movement of the table and the opposing action of the springs.

Figure 2:
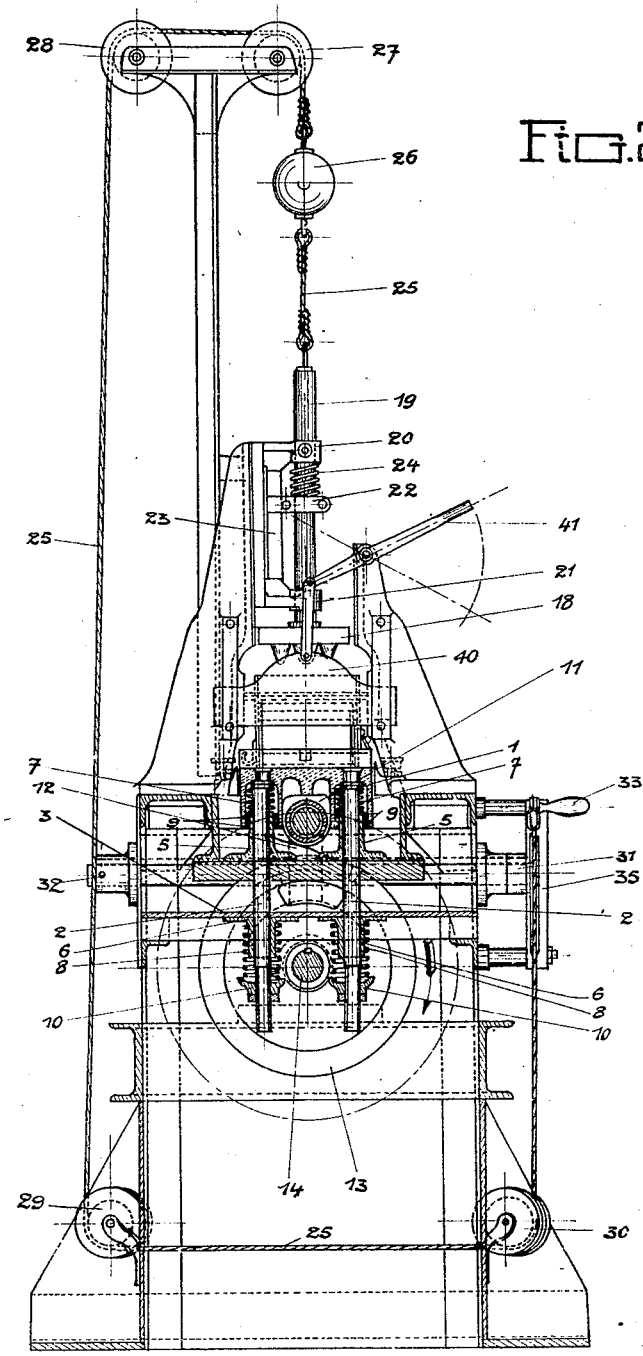

By way of example, two embodiments of the invention are illustrated in the accompanying drawings, in which Fig. 1 is a front elevation and Fig. 2 is a side elevation, partly in section on the line A B C of Fig. 1, of one embodiment.

Figure 3:
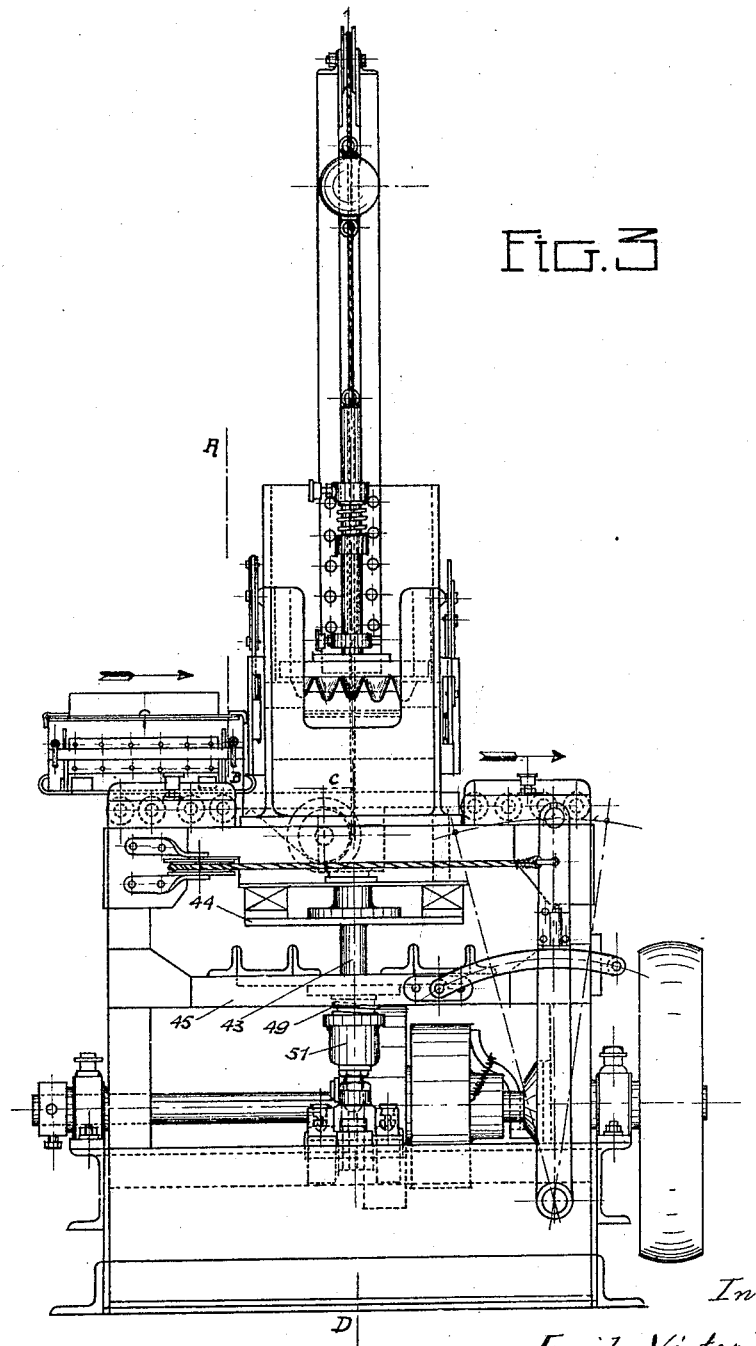
Figure 4:
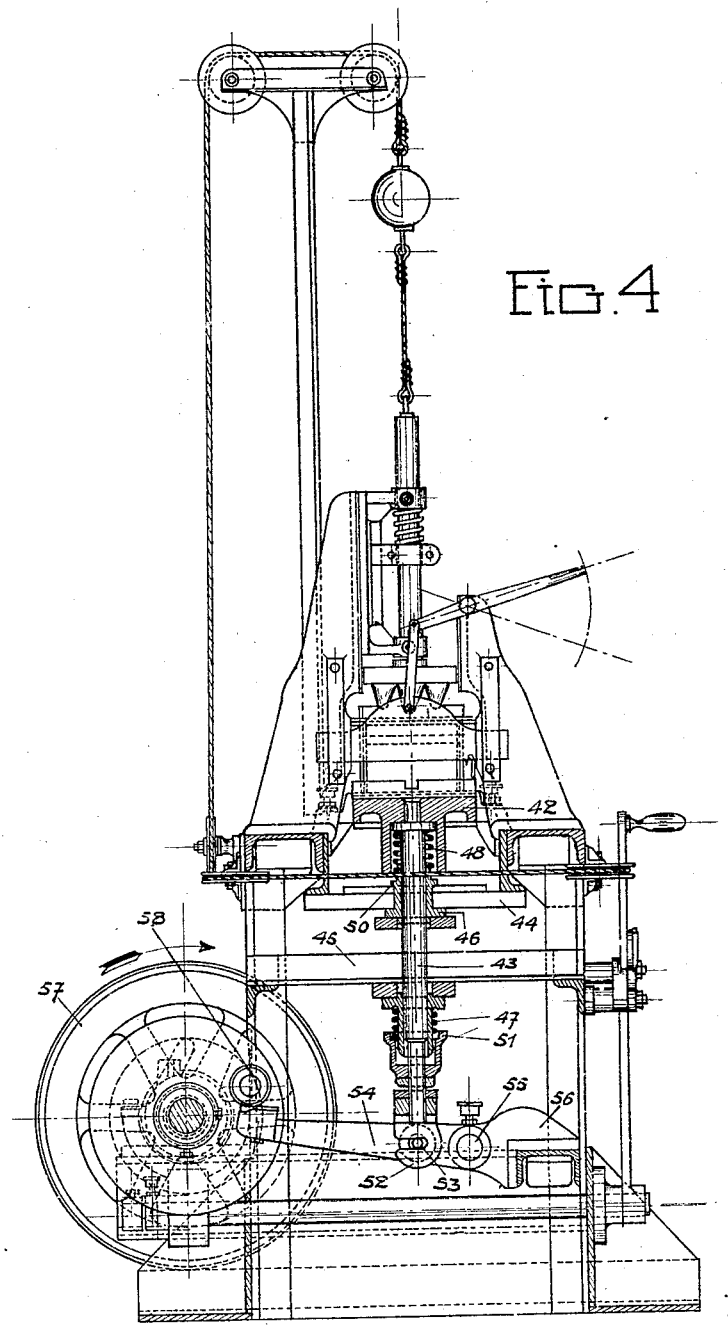

Fig. 3 is a front elevation, and Fig. 4 is a side elevation, partly in section on the line A B C D of Fig. 3, of the other embodiment.

In Figs. 1 and 2, 1 is the table provided with four legs 2 passing through the beams 3 and 4 of the frame. These beams bear the flanged sleeves 5 and 6, wherein the legs 2 slide. Springs 7 and 8 encircling the legs 2 act in opposite directions against the table, the springs 7 tending to move it upward, and the springs 8 downward. The springs 7 bear against the lower face of the table and against projections or abutments 9 which may be adjusted vertically to any desired position on the threaded sleeves 5 whereon they are mounted. The springs 8 bear against the beam 4 and against projections or abutments 10 which may be adjusted to any desired position by means of screw threads provided on the legs 2. Under the table 1 and between its two depending cheeks is pivoted roller 11, on which acts a cam 12, fixed on a fly-wheel 13, keyed on a shaft 14 connected to the drive pulley 15 by means of a friction clutch 16—17.

The rammer 18 comprises a guide rod 19 guided in bearing sleeves 20 and 21 and having fastened to it a collar 22 which slidably engages a vertical bar 23 connecting said sleeves in order to prevent angular displacements of the rammer. A spring 24, encircling the rod 19 and interposed between the upper bearing 20 and the collar 22, yieldingly limits the upward motion of the rammer 18.

To the upper end of the guide rod 19 is connected one end of a cable 25 utilized for raising the rammer and supporting a counterweight 26. The cable 25 passes around grooved pulleys 27, 28, 29 and 30, and its other end is attached to the lever 31, which is pivoted on the shaft 32, and is provided with a handle 33 and a detent 34 for engagement with the toothed sector 35 in order to permit the retention of the lever in adjusted position.

A rod 36, keyed on the shaft 32 and consequently following the displacements of the the lever 31 which effects the upward movement of the rammer, is operatively connected to the drum 17 of the friction clutch 16, 17, so that the clutch is closed when said lever is moved downward and is opened when the lever is moved upward, the latter movement of said lever raising the rammer.

The mould 37, displaced on the rollers 38 in the direction of the arrows shown in Fig. 1 is engaged on the table 1 between the held guides 39, and is fixed between the vertically movable guides 40, provided with handle-levers 41. The surface of the cam 12 as shown, is curved, being partially convex and partially concave, this latter part forming the projection of the cam. This form has been adopted, as having the greatest efficiency. The cam 12 can however be placed in the usual manner, or can present only a single concave surface.

At each rotation of the fly-wheel 13, the cam 12 moves the table 1 abruptly upward by striking against its roller 11, thereby moving the mould 37 upward and, with it, the rammer 18 which is resting on the material in the mould. When cam 12 releases roller 18, the table drops abruptly downward, due to gravity and to the action of the springs 8 which were tensioned during the upward movement of the table just completed; this downward movement of the table causing the mould and the rammer to also fall. The mould, however, drops more quickly than the rammer, so that the material is subjected to two actions which occur in quick succession: first, the jar due to the fall of the mould on the table and, second, the ramming action caused by the fall of the rammer. The table itself is, of course, checked in its downward movement by the cushioning action of the springs 7, which are compressed as the table drops, and is then abruptly pulled back by the springs 7.

The complete operation is substantially as follows:—The mould 37 is loaded and then moved forwardly along the table to a position between the fixed guides 39 and directly beneath the rammer 18 which has previously been raised. The movable guides 40, which have likewise been raised before the above operation, are now lowered by means of their controlling levers 41 so that the mould is thus retained in place. The rammer 18, in its raised position, is located above and out of contact with the mould, as shown in Fig. 2, and is now lowered until it rests on the material in the mould by moving lever 31 downward; this downward movement of the lever ultimately closing the clutch 17—16 automatically and starting the machine, due to the connection 36 between the shaft 32 to which the lever is fastened and the clutch drum 17. The shaft 14 whereon the driving pulley 15 is mounted now commences to rotate and, hence, to rotate the fly-wheel 13 carrying cam 12, and the latter thereupon proceeds to jog the table 1 at regular intervals, in the manner above explained. The operating lever 31 is maintained in adjusted position by the engagement of its detent 34 with the toothed sector or rack 35, as will be understood.

After the jogging or jarring and ramming operations have been repeated as often as may be necessary or desired, the detent 34 on the operating lever is disengaged from rack 35 and said lever is thereupon raised, such movement raising the rammer into inactive position above the mould and opening the controlling clutch 17—16 between the driving pulley and the fly-wheel shaft, the clutch-opening movement occurring before the raising of the rammer. The rotation of the latter then ceases; and the mould can then be removed, after the guides 40 have been raised, and replaced by another filled mould. The cycle of operations described above is then repeated.

In Figs. 3 and 4, 42 is the table provided with a leg 43 passing through the beams 44 and 45 of the frame. These beams support the sleeves 46 and 47 wherein the leg 43 slides. The springs 48 and 49, encircling the leg 43 act on the table, in such a manner that the first tends to move it downwardly and the other upwardly.

The spring 48 bears against the lower face of the table and against the abutment 50, while the spring 49 bears against the abutment 51, which may be adjusted to the desired height on the threaded lower portion of the leg 43.

At the lower extremity of the leg 43 is fixed a hook 52 wherein a cross-pin 53 is slidably engaged, said pin being secured to a lever 54 pivoted on the shaft 55 and provided at one extremity with a counterweight 56. The other extremity of the lever 54 is lowered at each rotation of the fly-wheel 57, by a projection or driver 58 formed by a roller mounted on a stud or pin fixed laterally to said fly-wheel 57, in order to draw the table 42 downwards, against the force of the spring 48, and then release it for the purpose above described. The other elements of the apparatus shown in Figs. 3 and 4 are the same, substantially, as those represented in Figs. 1 and 2.

At each revolution of the fly-wheel 57, the table 42 is drawn downwards, thereby compressing the spring 48; and as soon as the lever 54 has been disengaged from the driver 58 by the action of its counter-weight 56, the table 42 is projected upwardly by the expansion of the spring 48, the spring 49 acting as a damper to limit the upward motion of said table. The action on the mould and on the rammer is the same as that described above in connection with Figs. 1 and 2.

I claim as my invention:

1. The herein-described process of manufacturing molded articles from material in a state of division in a mould, comprising the steps of supporting a rammer upon the surface of the material in the mould; and then imparting automatically to the support whereon the mould rests a succession of abrupt vertical movements, thereby to effect successively, after each such movement, the fall of the mould upon its support and the fall of the rammer upon the material.

2. The herein-described process of manufacturing molded articles from material in a state of division in a mould, comprising the steps of supporting a freely-suspended rammer upon the surface of the material in the mould; and then imparting automatically to the support whereon the mould rests a succession of abrupt vertical movements, so as to effect a displacement of the mould with relation to its support and a displacement of the rammer with relation to the material consequent upon each such movement of said support, thereby causing the successive fall of the mould upon its support and the fall of the rammer upon the material.

3. Apparatus for manufacturing molded articles from material in a state of division in a mould, comprising a table for supporting the mould mounted for vertical movement; oppositely-acting springs associated with the table and tending to move it in opposite directions; and mechanism independent of the springs for automatically imparting a succession of abrupt movements to the table.

4. Apparatus for manufacturing molded articles from material in a state of division in a mould, comprising a table for supporting the mould mounted for vertical movement; oppositely-acting springs associated with the table and tending to move it in opposite directions; means associated with the springs for adjusting their tension; and mechanism independent of the springs for automatically imparting a succession of abrupt movements to the table.

5. Apparatus for manufacturing molded articles from material in a state of division in a mould, comprising a mould-supporting table mounted for vertical movement; mechanism for automatically imparting a succession of abrupt movements to the table; and a rammer operable upon the material in the mould to pack the same therein.

6. Apparatus for manufacturing molded articles from material in a state of division in a mould, comprising a mould-supporting table mounted for vertical movement; mechanism for automatically imparting a succession of abrupt movements to the table; and a rammer normally resting upon the top surface of the material in the mould and operable automatically thereon consequent upon the abrupt movements of the table.

7. Apparatus for manufacturing molded articles from material in a state of division in a mould, comprising a mould-supporting table mounted for vertical movement; mechanism for automatically imparting a succession of abrupt movements to the table; and a rammer freely suspended from a flexible element to normally rest upon the material in the mould and operable automatically thereon consequent upon the abrupt movements of the table.

8. Apparatus for manufacturing molded articles from material in a state of division in a mould, comprising a mould-supporting table mounted for vertical movement; mechanism for automatically imparting a succession of abrupt movements to the table; a rammer operable upon the material in the mold to pack the same therein; a flexible element from which the rammer is freely suspended; and means connected to said element for raising and lowering the rammer.

9. Apparatus for manufacturing molded articles from material in a state of division in a mould, comprising a mould-supporting table mounted for vertical movement; mechanism for automatically imparting a succession of abrupt movements to the table; a rammer normally resting upon the top surface of the material in the mould and operable automatically thereon consequent upon the abrupt movements of the table; a flexible element from which the rammer is freely suspended; and means connected to said element for raising and lowering the rammer.

10. Apparatus for manufacturing molded articles from material in a state of division in a mould, comprising a mould-supporting table mounted for vertical movement; oppositely-acting springs associated with the table and tending to move it in opposite directions; mechanism independent of said springs for imparting a succession of abrupt movements to the table; and a rammer operable upon the material in the mould to pack the same therein.

11. Apparatus for manufacturing molded articles from material in a state of division in a mould, comprising a mould-supporting table mounted for vertical movement; oppositely-acting springs associated with the table and tending to move it in opposite directions; mechanism independent of said springs for imparting a succession of abrupt movements to the table; and a rammer normally resting upon the top surface of the material in the mould and operable automatically thereon consequent upon the abrupt movements of the table.

12. Apparatus for manufacturing molded articles from material in a state of division in a mould, comprising a mould-supporting table mounted for vertical movement; mechanism for automatically imparting a succession of abrupt movements to the table; a drive shaft connected to operate said mechanism and provided with a clutch for controlling its rotation; a rammer operable upon the material in the mould to pack the same therein; and a single controlling device for raising and lowering the rammer and opening and closing the clutch.

13. Apparatus for manufacturing molded articles from material in a state of division in a mould, comprising a mould-supporting table mounted for vertical movement; mechanism for automatically imparting a succession of abrupt movements to the table; a drive shaft connected to operate said mechanism and provided with a clutch for controlling its rotation; a rammer operable upon the material in the mould to pack the same therein; and a single controlling device connected to lower the rammer into active position and close the clutch.

14. Apparatus for manufacturing molded articles from material in a state of division in a mould, comprising a mould-supporting table mounted for vertical movement; mechanism for automatically imparting a succession of abrupt movements to the table; a drive shaft connected to operate said mechanism and provided with a clutch for controlling its rotation; a rammer operable upon the material in the mould to pack the same therein; and a single controlling device connected to raise the rammer into inactive position and open the clutch.

15. Apparatus for manufacturing molded articles from material in a state of division in a mould, comprising a mould-supporting table mounted for vertical movement; mechanism for automatically imparting a succession of abrupt movements to the table; a drive shaft connected to operate said mechanism and provided with a clutch for controlling its rotation; a rammer operable upon the material in the mould to pack the same therein; and a controlling device common to both the rammer and the clutch for lowering the rammer and closing the clutch, and for raising the rammer and opening the clutch.

16. Apparatus for manufacturing molded articles from material in a state of division in a mould, comprising a mould-supporting table mounted for vertical movement; mechanism for automatically imparting a succession of abrupt movements to the table; a drive shaft connected to operate said mechanism and provided with a clutch for controlling its rotation; a rammer operable upon the material in the mould to pack the same therein; and a single controlling device for positioning the rammer relatively to the mould and for governing the activity of the clutch.

17. Apparatus according to claim 13 in which the controlling device closes the clutch after the rammer has been lowered.

18. Apparatus according to claim 14 in which the controlling device opens the clutch ahead of the raising of the rammer.

19. Apparatus for manufacturing molded articles from material in a state of division in a mould, comprising a mould-supporting table mounted for vertical movement; mechanism for automatically imparting a succession of abrupt movements to the table; a drive shaft connected to operate said mechanism and provided with a clutch for controlling its rotation; a rammer operable upon the material in the mould to pack the same therein; and a controlling device common to both the rammer and the clutch for initially lowering the rammer and subsequently closing the clutch, and for initially opening the clutch and subsequently raising the rammer.

20. Apparatus for manufacturing molded articles from material in a state of division in a mould, comprising a mould-supporting table mounted for vertical movement; mechanism for automatically imparting a succession of abrupt movements to the table; a drive shaft connected to operate said mechanism and provided with a clutch; a rammer operable upon the material in the mould to pack the same therein; a flexible element from which the rammer is freely suspended; an operating lever connected to said element to lower and raise the rammer; and a connection between the lever and the clutch to enable the former to open and close the latter.

21. Apparatus for manufacturing molded articles from material in a state of division in a mould, comprising a mould-supporting table mounted for vertical movement; mechanism for automatically imparting a succession of abrupt movements to the table; a drive shaft connected to operate said mechanism and provided with a clutch; a rammer operable upon the material in the mould to pack the same therein; a single controlling lever; and separate connections between said lever and the rammer and clutch to enable the lever to lower the rammer and close the clutch during its movement in one direction, and to open the clutch and raise the rammer during its movement in the opposite direction.

22. Apparatus for manufacturing molded articles from material in a state of division in a mould, comprising a mould-supporting table mounted for vertical movement; mechanism for automatically imparting a succession of abrupt movements to the table; a drive shaft connected to operate said mechanism and provided with a clutch; a rammer operable upon the material in the mould to pack the same therein; a flexible element from which the rammer is freely suspended; a lever connected to said element to lower the rammer into active position with relation to the material when moved in one direction, and to raise it into inactive position thereabove when moved in the other direction; and a connection between said lever and the clutch enabling the lever to close the clutch during its first-named movement, and to open it during its second-named movement.

23. Apparatus for manufacturing molded articles from material in a state of division in a mould, comprising a mould-supporting table mounted for vertical movement; and mechanism, embodying a roller attached to the under side of the table and a rotating cam periodically engageable with said roller, for automatically imparting a succession of abrupt upward movements to the table.

24. Apparatus for manufacturing molded articles from material in a state of division in a mould, comprising a mould-supporting table mounted for vertical movement; oppositely-acting springs associated with the table and tending to move it in opposite directions; and mechanism, independent of the springs, embodying a roller attached to the under side of the table and a rotating cam periodically engageable with said roller, for automatically imparting a succession of abrupt upward movements to the table.

In testimony whereof I affix my signature.

EMILE VICTOR PREUSS.

Witnesses:
LEONARD LEVA,
FRANCOIS BRIGODE.